United States Patent
Spiess

(10) Patent No.: US 7,952,846 B2
(45) Date of Patent: May 31, 2011

(54) POWER LINE COMMUNICATION METHOD

(75) Inventor: Hermann Spiess, Habsburg (CH)

(73) Assignee: ABB Technology AG, Zurich (CH)

( * ) Notice: Subject to any disclaimer, the term of this patent is extended or adjusted under 35 U.S.C. 154(b) by 1041 days.

(21) Appl. No.: 11/783,041

(22) Filed: Apr. 5, 2007

(65) Prior Publication Data

US 2007/0285223 A1    Dec. 13, 2007

(30) Foreign Application Priority Data

Apr. 27, 2006   (EP) .................................. 06405185

(51) Int. Cl.
*H02H 3/00* (2006.01)
*H02H 7/00* (2006.01)

(52) U.S. Cl. ........................................................ 361/64

(58) Field of Classification Search ............... 361/64
See application file for complete search history.

(56) References Cited

U.S. PATENT DOCUMENTS 7,180,412 B2 * 2/2007 Bonicatto et al. ........ 340/538.11
2003/0156369 A1 8/2003 Stritmatter

OTHER PUBLICATIONS

Morf K: "ETL—A New Family of PLC Equipment" ABB Review, ABB Asea Brown Boveri, Zurich, CH, No. 7/8, Jan. 1992, pp. 23-30, XP000311818 ISSN: 1013-3119 * p. 24, right-hand column-p. 25, left-hand column; figure 3*.
Spiess H: "NSD 70—A New Family of Programmable, Digital Protection Signalling Equipment" ABB Review, ABB Asea Brown Boveri, Zurich, CH, No. 6, Jan. 1992, pp. 3-10. XP000311533 ISSN: 1013-3119 *p. 5, paragraphs 7,8*.
European Search Report.

* cited by examiner

*Primary Examiner* — Dharti H Patel
(74) *Attorney, Agent, or Firm* — Buchanan Ingersoll & Rooney PC

(57) ABSTRACT

In an electric power transmission network, comprising several substations interconnected by power transmission lines, a communication device of a substation communicates over a power transmission line to a communication device of a neighboring substation by using command signals in a frequency band and a guard signal located in a first half of the frequency band. For successive lines, a repeating sequence of different schemes of command signals is used, each of the schemes comprising only command signals with frequencies located in a second half of the frequency band. By using a repeating sequence of different schemes for successive lines and by using in each of the schemes only command signals with frequencies located in one half of the reserved frequency band, it is possible to reduce the number of different frequency bands required in electric power transmission networks for transmitting command signals used for coding (tele-) protection commands.

14 Claims, 2 Drawing Sheets

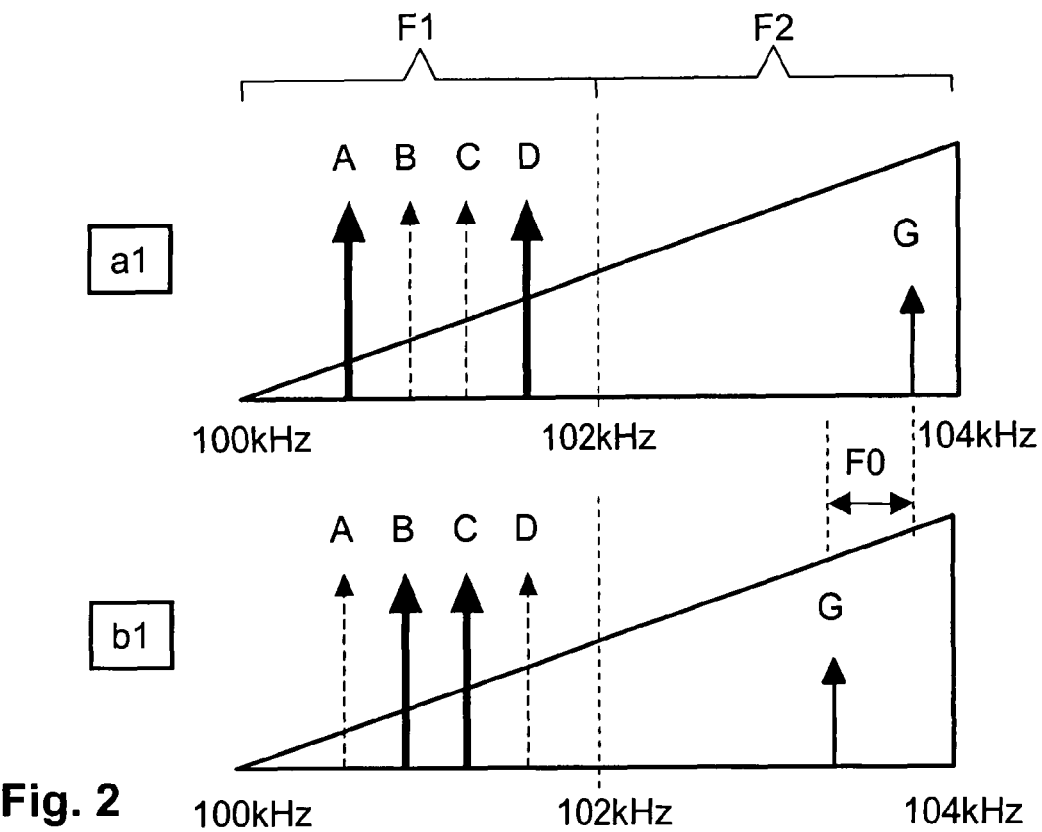
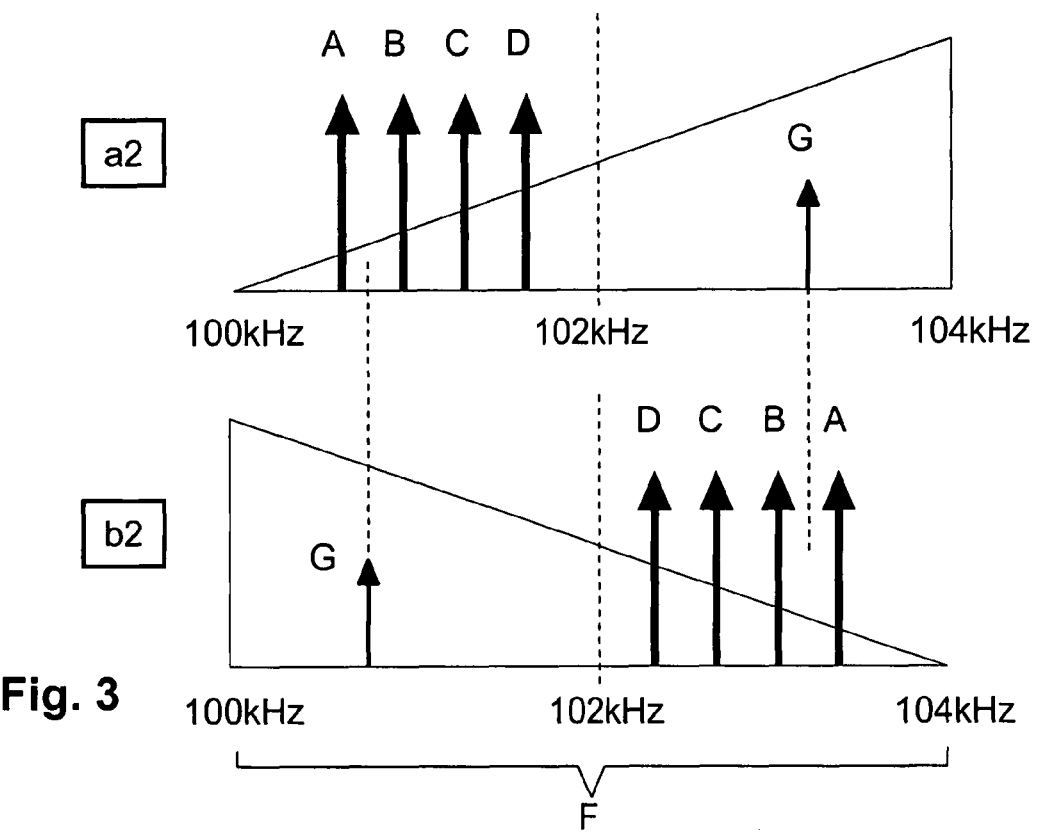
Fig. 2
Fig. 3

POWER LINE COMMUNICATION METHOD

RELATED APPLICATIONS

This application claims priority under 35 U.S.C. §119 to EP Application 06405185.7 filed in Europe on Apr. 27, 2006, the entire contents of which are hereby incorporated by reference in their entireties.

TECHNICAL FIELD

A power line communication method is disclosed for electric power transmission networks. Specifically, the disclosure relates to a power line communication method for electric power transmission networks comprising several substations interconnected by power transmission lines.

BACKGROUND INFORMATION

Power Line Communication (PLC) over high or medium voltage power lines can be used to transmit specific (tele-) protection commands over channels of small bandwidth, for example a bandwidth of 2 kHz located at the low end of the frequency band available for power line communication services. Typically, older PLC equipment is provided with a limited bandwidth of 2 kHz for transmitting command signals, used for coding (tele-)protection commands, as well as a guard frequency. Modern PLC equipment, on the other hand, offers typically a bandwidth of 4 kHz; with the guard frequency being preferably located in the upper half of this available frequency band. The guard frequency can be shifted within the upper half; however, moving the guard frequency to the lower half would require hardware filters to be changed, what is to be avoided. In existing networks, frequencies adjacent to the formerly used 2 kHz band are often occupied by other services. Consequently, in this case the modern PLC equipment cannot be used as if the network were designed from scratch. Nevertheless, even in new designs of PLC networks having no historical restraints and having a bandwidth of 40-500 kHz reserved for protection applications, it is generally advantageous not to waste bandwidth but to use 4 kHz PLC equipment and save the remaining bandwidth for other purposes.

SUMMARY

A power line communication method and a power line communication system make it possible to make efficient use of frequency bands for dedicated teleprotection applications plus service voice channel, if needed. A power line communication method and a power line communication system are disclosed, which make it possible to reduce the number of different frequency bands, required in electric power transmission networks.

In an electric power transmission network comprising several substations interconnected by power transmission lines, a communication device of a substation communicates over a power transmission line to a communication device of a neighboring substation by using command signals in a frequency band and a guard signal located in a first half of the frequency band. The communication devices use a repeating sequence of different schemes of command signals for successive lines wherein each of the schemes comprises only command signals with frequencies located in a second half of the frequency band. For example, different schemes "a" and "b" can be repeated as sequence "ab" after two successive lines. By using a repeating sequence of different schemes of command signals for successive lines and by using in each of the schemes only command signals with frequencies located in one half of the reserved frequency band, it is possible to reduce the number of different frequency bands required in electric power transmission networks for transmitting command signals used for coding (tele-) protection commands. Specifically, the proposed power line communication method and system may provide a viable alternative to 2 kHz PLC equipment, i.e. the older 2 kHz PLC equipment can be replaced by a more modern broadband 4 kHz PLC systems.

In a first exemplary embodiment, the different schemes in the repeating sequence comprise command signals with frequencies located in the same half of the frequency band, and the guard signals associated with the different schemes in the repeating sequence have frequencies that differ by a defined frequency offset. Keeping the command signal frequencies in the same half of the frequency band makes it possible to conserve bandwidth. Furthermore, by separating the guard signal frequencies by a frequency offset of at least 480 Hz, for example, interference can be avoided and the guard signal can be filtered reasonably. As exemplified by the first exemplary embodiment, different sets of command signals with different frequencies can be used for the different schemes of command signals.

In a second exemplary embodiment, the different schemes in the repeating sequence comprise command signals with frequencies located in alternating halves of the frequency band, and the guard signals associated with the different schemes in the repeating sequence have alternating frequencies located in the respective half of the frequency band without frequencies of command signals. As exemplified by the second exemplary embodiment, the guard signals can have frequency values in between frequency values used for command signals.

In a further exemplary embodiment, for substations connected to more than two power transmission lines, an additional alternative frequency band can be used for communicating command and guard signals to one of the neighboring substations.

In a power line communication system for electric power transmission networks comprising several substations interconnected by power transmission lines, the system comprises communication devices configured to communicate over one of the lines to a communication device of a neighboring substation, by using command signals in a frequency band and a guard signal located in a first half of the frequency band, the communication devices being further configured to use different schemes of command signals for successive lines, each of the schemes comprising only command signals with frequencies located in a second half of the frequency band.

BRIEF DESCRIPTION OF THE DRAWINGS

The present invention will be explained in more detail, by way of example, with reference to the drawings in which:

FIG. 2 shows an example of two different schemes of command signals with frequencies located in one common half of a reserved frequency band, FIG. 3 shows another example of different schemes, each scheme having command signals with frequencies located in a different half of the reserved frequency band.

DETAILED DESCRIPTION

Figure 1:
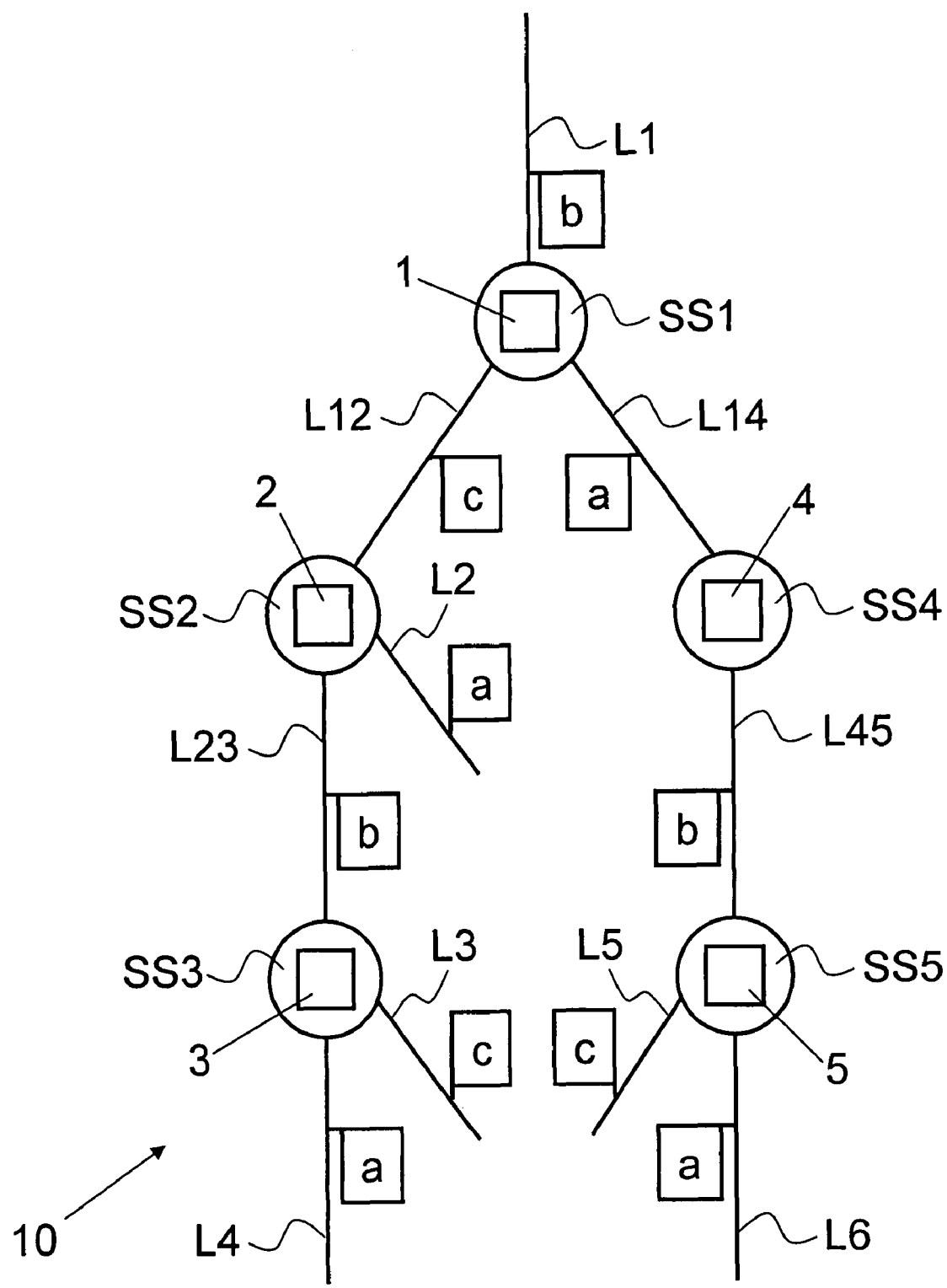
FIG. 1 shows a segment of an exemplary electric power transmission network comprising several substations interconnected by power transmission lines.

FIG. 1 shows a block diagram illustrating schematically a segment of an exemplary electric power transmission or distribution network 10 comprising several substations SS1, SS2, SS3, SS4, and SS5, interconnected by power transmission lines L1, L12, L14, L2, L23, L3, L4, L45, L5, and L6, e.g. high voltage power lines operating at 70 kV or above. As is illustrated in FIG. 1, the substations SS1, SS2, SS3, SS4, SS5 each comprise a communication device 1, 2, 3, 4, 5. The communication devices 1, 2, 3, 4, 5 comprise a PLC modem for communicating over the power lines and a teleprotection module. For example, the PLC modem can be an ETL540 or another member of ABB's ETL500 family of software programmable Power Line Carrier systems for the transmission of speech, data, and protection signals over high-voltage lines. For example, the teleprotection module can be an NSD550 plug-in card by ABB for the ETL540 or for another member of the ETL500 family. The NSD550 plug-in card configured to transmit up to four (tele-protection-) commands with two different modes of operation, i.e. either two permissive and two direct trip commands, or three permissive and one direct trip commands.

As is indicated in FIG. 1, different schemes a, b, c of line protection commands can be transmitted over the power transmission lines L1, L12, L14, L2, L23, L3, L4, L45, L5, L6 between the respective delimiting substations SS1, SS2, SS3, SS4, SS5. The reference numerals a, b, c refer to schemes of command signals as depicted in FIGS. 2 and 3, for example. The command signal schemes a, b, c indicate which command signals (type and frequency) are to be employed. As is shown in FIG. 1, the communication devices 1, 2, 3, 4, 5 can be configured to use different schemes of command signals a, b, c for successive lines; specifically, the communication devices 1, 2, 3, 4, 5 can be configured to use a repeating sequence ("ab") of different command signal schemes a, b for successive lines. For example along the lines L1, L14, L45, L6, the command signals schemes a, b can be repeated on every second line.

FIGS. 2 and 3 show examples of different command signal schemes a1, b1, a2, and b2. The arrows A, B, C, D represent symbolically the command signals (single tones or alternate coded tones) for commands A to D of the NSD550 plug-in card. For ease of reference, only single-tone signals (one frequency per command signal) are depicted in FIGS. 2 and 3; nevertheless, other command signal types, e.g. dual-tone or the like, are possible also. Arrow G represents the guard signal, for example, the pilot signal of the PLC modem, e.g. the pilot signal of the ETL500 Power Line Carrier systems, or the dedicated guard signal provided by the teleprotection module. The command signal schemes a and b (or a1, b1, a2, b2, respectively) share the same PLC frequency band F, e.g. 100 k-104 kHz; command signal scheme c uses a different frequency band. It should be noted that only the transmission (Tx) band is shown; the reception (Rx) band, for communicating in the opposite direction, being distinct from and either adjacent or non-adjacent to the frequency band F.

FIG. 2 shows an example of two different command signal schemes a1, b1 for two commands. To implement these schemes, in FIG. 1, the communication devices 1, 2, 3, 4, 5 can be configured to use the command signal schemes a1, b1 for schemes a or b, respectively. Consequently, on power lines L14, L2, L4, L45, L6 associated with command signal scheme a (i.e. a1) commands A and D (or in another exemplary embodiment A and C) can be used; whereas on power lines L1, L23, L45 associated with command signal scheme b (i.e. b1) commands B and C (or in another exemplary embodiment B and D) can be used. As is illustrated in FIG. 2, the guard frequency G associated with the command signal scheme a1 differs from the guard frequency G associated with the command signal scheme b1 by a frequency offset F0. To avoid interferences, the guard frequencies G associated with command signal schemes a1 and b1 can be offset by e.g. 480 Hz. Furthermore, on power lines L12, L3, L5 associated with command signal scheme c, a different PLC frequency band should be used to prevent interference. Although unnecessary, for more conservative planning, a repeating sequence may comprise three or more different schemes, resulting in a particular scheme (a) being repeated on less than every second successive line, but still offering bandwidth savings in the grid, compared to conventional planning.

FIG. 3 shows an example of two different command signal schemes a2, b2 for four commands. Again, the command signal schemes a2 and b2 share the same PLC frequency band F, e.g. 100 kHz-104 kHz; whereas a different frequency band can be used for command signal scheme c. To implement these schemes, in FIG. 1, the communication devices 1, 2, 3, 4, 5 can be configured to use the command signal schemes a2, b2 for schemes a or b, respectively. Consequently, on power lines L14, L2, L4, L45, L6 associated with command signal scheme a (i.e. a2), commands A, B, C, D can be located in the lower half F1, and the guard signal G can be located in the upper half F2 of the frequency band F. On the other hand, on power lines L12, L3, L5 associated with command signal scheme b (i.e. b2), commands A, B, C, D can be located in the upper half F2 of the frequency band F, and the guard signal G associated with command signal scheme b2 being located in the lower half F1 of the frequency band F. For the purpose of converting scheme a2 into b2 and vice versa, for example, the frequency band F can be inverted or flipped from normal (erect) to inverted position, as indicated symbolically in FIG. 3 by the flipped triangle of command signal scheme b2. In the ETL500 Single-Sideband Power Line Carrier systems, for example, a special feature provides for such mirroring of normal and inverted positions. Thus, on power lines L14, L2, L4, L45, L6 associated with command signal scheme a (i.e. a2), the frequency band F can be set to normal position; whereas on power lines L12, L3, L5 associated with command signal scheme b (i.e. b2), the frequency band F can be set to inverted position. As indicated in FIG. 3, the frequencies of the guard signals G can be selected to be located between frequency values used for the command signals A, B, C, D. Essentially, in order to avoid interference, the frequencies of the guard signals G can be set in the middle of two command signals A, B, C, D having neighboring frequency values. Again, and although unnecessary, for a more conservative planning, one additional line can be skipped before frequencies are repeated, still offering bandwidth savings compared to conventional planning.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A power line communication method for electric power transmission networks comprising several substations interconnected by power transmission lines, the method comprising:

by a communication device of a substation, communicating commands over a power transmission line to a communication device of a neighboring substation by using command signals in a frequency band and a guard signal located in a first half of the frequency band, wherein a repeating sequence of different schemes of command signals for successive lines is used, each of the schemes indicating which command signals are to be employed for coding the commands and comprising only command signals with frequencies located in a second half of the frequency band.

2. The method of claim 1, wherein the different schemes in the repeating sequence comprise command signals with frequencies located in the same half of the frequency band, and wherein the guard signals associated with the different schemes in the repeating sequence have frequencies that differ by a defined frequency offset.

3. The method of claim 2, wherein the defined frequency offset is sufficient to prevent mutual interference of the guard signals on successive lines using the different schemes in the repeating sequence.

4. The method of claim 3, wherein different subsets of command signals with different frequencies are used for the different schemes of command signals.

5. The method of claim 1, wherein different subsets of command signals with different frequencies are used for the different schemes of command signals.

6. The method of claim 1, wherein the different schemes in the repeating sequence comprise command signals with frequencies located in alternating halves of the frequency band, and wherein the guard signals associated with the different schemes in the repeating sequence have alternating frequencies located in the half of the frequency band without frequencies of command signals.

7. The method of claim 6, wherein a first scheme of the different schemes is generated by inverting the frequency band including a second scheme.

8. The method of claim 6, wherein the guard signals have frequency values in between frequency values used for command signals.

9. The method of claim 8, wherein for substations connected to more than two power transmission lines, an additional alternative frequency band is used for communicating command and guard signals to one of the neighboring substations.

10. The method of claim 1, wherein for substations connected to more than two power transmission lines, an additional alternative frequency band is used for communicating command and guard signals to one of the neighboring substations.

11. The method of claim 10, wherein the command signals are used for coding protection commands.

12. The method of claim 1, wherein the command signals are used for coding protection commands.

13. A power line communication system for electric power transmission networks comprising several substations interconnected by power transmission lines, the system comprising:

in the substations, communication devices configured to communicate commands over a power transmission line to a communication device of a neighboring substation by using command signals in a frequency band and a guard signal located in a first half of the frequency band, wherein the communication devices are configured to use a repeating sequence of different schemes of command signals for successive lines, each of the schemes indicating which command signals are to be employed for coding the commands and comprising only command signals with frequencies located in a second half of the frequency band.

14. A power line communication method for a communication device of a substation, comprising:

command signaling in a frequency band of a power transmission line to a communication device of a neighboring substation, and guard signaling in a first half of the frequency band of the power transmission line, wherein a repeating sequence of different schemes of command signals for successive lines is used, each of the schemes indicating which command signals are to be employed for coding the commands and comprising includes command signals with frequencies in a second half of the frequency band.

\* \* \* \* \*